United States Patent
Yang et al.

(10) Patent No.: US 11,228,199 B2
(45) Date of Patent: Jan. 18, 2022

(54) WIRELESS CHARGING DEVICE AND WIRELESS CHARGING SYSTEM

(71) Applicant: BOE TECHNOLOGY GROUP CO., LTD., Beijing (CN)

(72) Inventors: Jun Yang, Beijing (CN); Yanfu Li, Beijing (CN); Wei Deng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 114 days.

(21) Appl. No.: 16/553,755

(22) Filed: Aug. 28, 2019

(65) Prior Publication Data
US 2020/0169110 A1 May 28, 2020

(30) Foreign Application Priority Data

Nov. 23, 2018 (CN) .......................... 201811408783.1

(51) Int. Cl.
*H02J 7/02* (2016.01)
*H02J 50/90* (2016.01)
(Continued)

(52) U.S. Cl.
CPC ............ *H02J 7/025* (2013.01); *H02J 7/0042* (2013.01); *H02J 7/027* (2013.01); *H02J 50/10* (2016.02); *H02J 50/40* (2016.02); *H02J 50/90* (2016.02)

(58) Field of Classification Search
CPC ...................................................... H02J 7/025
(Continued)

(56) References Cited

U.S. PATENT DOCUMENTS 10,707,701 B2 * 7/2020 Lee .................... G11B 13/04
2011/0241614 A1 * 10/2011 Yeh ..................... H02J 7/0027
320/108

(Continued)

FOREIGN PATENT DOCUMENTS

CN       102906828       1/2013
CN       103618350       3/2014
(Continued)

OTHER PUBLICATIONS

1st Office Action dated Mar. 23, 2020 for Chinese Patent Application No. 201811408783.1.

*Primary Examiner* — Edward Tso
*Assistant Examiner* — Ahmed H Omar
(74) *Attorney, Agent, or Firm* — Thomas | Horstemeyer, LLP

(57) ABSTRACT

A wireless charging device is configured to charge a terminal and includes a first transmitting coil and a second transmitting coil. The first transmitting coil and the second transmitting coil are in a layered distribution, and the second transmitting coil is movable between a first position and a second position along a direction perpendicular to a central axis of the second transmitting coil. When the second transmitting coil is located at the first position, an orthographic projection of the second transmitting coil on a preset plane partially coincides with an orthographic projection of the first transmitting coil on the preset plane, where the preset plane is perpendicular to the central axis. When the second transmitting coil is located at the second position, the orthographic projection of the second transmitting coil on the preset plane does not coincide with the orthographic projection of the first transmitting coil on the preset plane.

15 Claims, 4 Drawing Sheets

(51) Int. Cl.
*H02J 50/10* (2016.01)
*H02J 50/40* (2016.01)
*H02J 7/00* (2006.01)

(58) Field of Classification Search
USPC .......................................................... 320/108
See application file for complete search history.

(56) References Cited

U.S. PATENT DOCUMENTS

2014/0139034 A1* 5/2014 Sankar ................. H02J 50/402
 307/104
2016/0380467 A1* 12/2016 Shao .................... H04B 5/0037
 320/108

FOREIGN PATENT DOCUMENTS

| | | | | |
|---|---|---|---|---|
| CN | 104937809 | | 9/2015 | |
| CN | 205231777 | * | 5/2016 | ............. H02J 50/40 |
| CN | 107026509 | | 8/2017 | |
| CN | 107646161 | | 1/2018 | |
| CN | 108736582 | | 11/2018 | |
| JP | 2012213278 | | 11/2012 | |
| JP | 2012213278 A1 | * | 11/2012 | ............. H01F 38/14 |
| JP | 2016220268 | | 12/2016 | |

\* cited by examiner

WIRELESS CHARGING DEVICE AND WIRELESS CHARGING SYSTEM

CROSS REFERENCE TO RELATED APPLICATIONS

The present application is based upon and claims priority of Chinese Patent Application No. 201811408783.1, filed on Nov. 23, 2018, the entire disclosure of which is hereby incorporated by reference as a part of the present application.

TECHNICAL FIELD

The present disclosure relates to the field of wireless charging technologies and, in particular, to a wireless charging device and a wireless charging system.

BACKGROUND

In the 21st century, people have entered the information age, and terminals, such as mobile phones, computers, or the like, have become important items in people's lives. There is no need to set a hot connection point between a charging device and the terminal when the terminal is charged by wireless charging. Instead, wireless charging may be employed, thereby avoiding the risk of electric shock.

Existing wireless charging devices are provided with a transmitting coil. In the case where the transmitting coil is powered on, a receiving coil provided in the terminal can generate a current by electromagnetic induction to charge the terminal.

It should be noted that the information disclosed in the Background section above is only for enhancing the understanding of the background of the present disclosure and thus may include information that does not constitute prior art known to those of ordinary skill in the art.

SUMMARY

An object of the present disclosure is to provide a wireless charging device and a wireless charging system.

According to an aspect of the present disclosure, a wireless charging device is provided, including a first transmitting coil and a second transmitting coil. The first transmitting coil and the second transmitting coil are both used to charge a terminal. The first transmitting coil and the second transmitting coil are in a layering distribution, and the second transmitting coil is movable between a first position and a second position along a direction perpendicular to a central axis of the second transmitting coil. When the second transmitting coil is located at the first position, an orthographic projection of the second transmitting coil on a preset plane coincides with an orthographic projection of the first transmitting coil on the preset plane, where the preset plane is perpendicular to the central axis. When the second transmitting coil is located at the second position, the orthographic projection of the second transmitting coil on the preset plane does not coincide with the orthographic projection of the first transmitting coil on the preset plane.

In an exemplary embodiment of the present disclosure, the wireless charging device further includes a housing which has a cavity. The cavity has an opening through which the second transmitting coil passes. When the second transmitting coil is located at the first position, the second transmitting coil is located in the cavity. When the second transmitting coil is located at the second position, the second transmitting coil is located outside the cavity.

In an exemplary embodiment of the present disclosure, the wireless charging device further includes a rail coupled to an inner wall of the housing and perpendicular to the central axis. The second transmitting coil is movably disposed on the rail.

In an exemplary embodiment of the present disclosure, the wireless charging device further includes a position detecting device and a control device. The position detecting device is configured to detect a position of the second transmitting coil and transmit a first signal when the second transmitting coil is located at the first position, and transmit a second signal when the second transmitting coil is located at the second position. The control device is configured to control one of the two transmitting coils to be powered on in response to the first signal, and to control both of the transmitting coils to be powered on in response to the second signal.

In an exemplary embodiment of the present disclosure, the control device includes a power acquisition module and a first processing module. The power acquisition module is configured to control, in response to the second signal, the first transmitting coil to be powered on and the second transmitting coil to be powered off and acquire a second charging power of the terminal; and control the first transmission coil to be powered off and the second transmitting coil to be powered on and acquire a second charging power of the terminal; the first processing module is configured to compare the first charging power with the second charging power and control the first transmitting coil to remain powered off and the second transmitting coil to remain powered on when the first charging power is less than the second charging power and control the first transmitting coil to remain powered on and the second transmitting coil to remain powered off when the first charging power is greater than the second charging power.

In an exemplary embodiment of the present disclosure, the control device is further configured to issue an alarm command in response to the first signal. The charging device further includes an alarm device configured to alarm in response to the alarm command.

In an exemplary embodiment of the present disclosure, the alarm device is a buzzer or an alarm light.

In an exemplary embodiment of the present disclosure, the position detecting device is a piezoelectric switch.

In an exemplary embodiment of the present disclosure, the wireless charging device further includes a parameter detecting device configured to detect an operating parameter of the first transmitting coil or the second transmitting coil. The control device further includes a second processing module. The second processing module is configured to compare the operating parameter with a preset value and control the first transmitting coil to be powered off when the operating parameter of the first transmitting coil is less than the preset value, and control the second transmitting coil to be powered off when the operating parameter of the second transmitting coil is less than a preset value.

According to an aspect of the present disclosure, a wireless charging system is provided, including the wireless charging device of any of the above.

It should be noted that the above general description and the following detailed description are merely exemplary and explanatory and should not be construed as limiting of the disclosure.

BRIEF DESCRIPTION OF THE DRAWINGS

The above and other features and advantages of the present disclosure will become more apparent from the detailed description of exemplary embodiments with reference to the drawings. It should be noted that the drawings in the following description show only some of the embodiments of the present disclosure, and other drawings may be obtained by those skilled in the art without departing from the drawings described herein.

DETAILED DESCRIPTION

Figure 1:
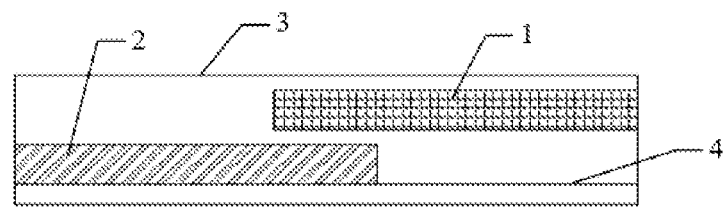
FIG. 1 is a front view of a wireless charging device of an implementation of the present disclosure when a second transmitting coil is in a first position.
Figure 2:
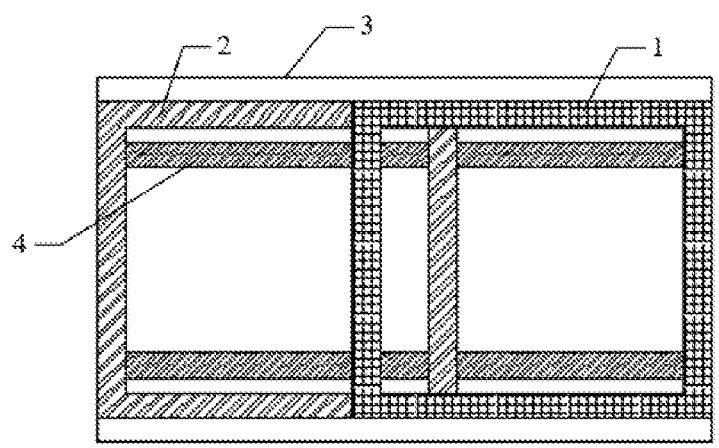
FIG. 2 is a plan view of the wireless charging device of an implementation of the present disclosure when a second transmitting coil is in a first position.

Example embodiments will now be described more fully with reference to the accompanying drawings. However, the embodiments can be implemented in a variety of forms and should not be construed as being limited to the examples set forth herein. Rather, these embodiments are provided so that this disclosure will be more complete so as to convey the idea of the exemplary embodiments to those skilled in this art. The described features, structures, or characteristics in one or more embodiments may be combined in any suitable manner. In the following description, numerous specific details are set forth to provide a full understanding of the embodiments of the present disclosure. However, one skilled in the art will appreciate that the technical solutions of the present disclosure can be practiced when one or more of the described specific details may be omitted or other methods may be employed. In other instances, well-known technical solutions are not shown or described in detail to avoid obscuring aspects of the present disclosure.

The terms "a" and "the" are used to indicate the presence of one or more elements/components, etc. The terms "include" and "have" are used to indicate an open type meaning of "including," and means that there may be additional elements, components, etc. in addition to the listed elements, components, etc.

An implementation of the present disclosure provides a wireless charging device configured to charge terminals, such as a mobile phone, a computer, an electric toothbrush, or the like. As shown in FIGS. 1-4, the wireless charging device can include a first transmitting coil 1 and a second transmitting coil 2, wherein:

the first transmitting coil 1 and the second transmitting coil 2 are in layering distribution, and the second transmitting coil 2 is movable between a first position and a second position along a direction perpendicular to a central axis of the second transmitting coil 2. When the second transmitting coil 2 is located at the first position, an orthographic projection of the second transmitting coil 2 on a preset plane coincides with an orthographic projection of the first transmitting coil 1 on the preset plane, where the preset plane is perpendicular to the central axis. When the second transmitting coil 2 is located at the second position, the orthographic projection of the second transmitting coil 2 on the preset plane does not coincide with the orthographic projection of the first transmitting coil 1 on the preset plane.

The wireless charging device of the implementation of the present disclosure move the second transmitting coil 2 to the first position when charging one terminal, so that the orthographic projection of the first transmitting coil 1 partially coincides with the orthographic projection of the second transmitting coil 2, expanding the electromagnetic induction area of the receiving coil of the terminal and increasing the charging efficiency, thereby improving the utilization of the transmitting coil. By moving the second transmitting coil 2 to the second position, the orthographic projection of the first transmitting coil 1 does not coincide with the orthographic projection of the second transmitting coil 2, thereby charging two terminals at the same time to improve the utilization of the transmitting coil.

The various parts of the wireless charging device of the implementation of the present disclosure are described in detail below:

As shown in FIGS. 1-4, both the first transmitting coil 1 and the second transmitting coil 2 can generate a magnetic field after being powered on, so that the receiving coil disposed in the terminal generates a current when being close to the magnetic field, thereby achieving charging of the terminal. Both the first transmitting coil 1 and the second transmitting coil 2 may have a spiral structure, and the size of the two transmitting coils may be the same.

Figure 3:
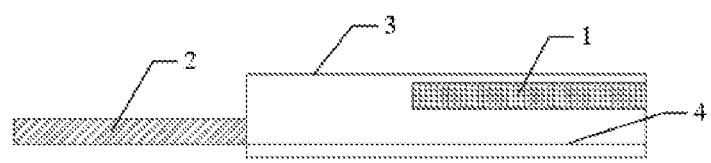
FIG. 3 is a front view of the wireless charging device of an implementation of the present disclosure when a second transmitting coil is in a second position.
Figure 4:
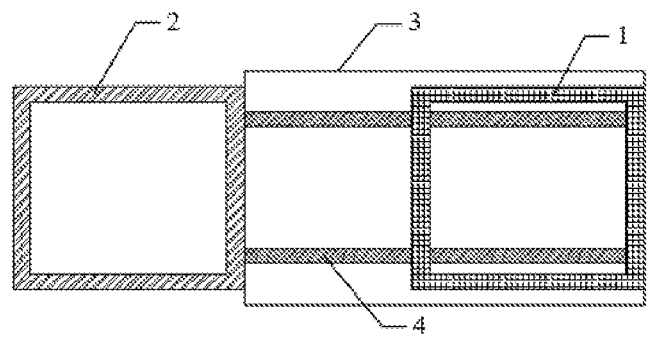
FIG. 4 is a plan view of the wireless charging device of an implementation of the present disclosure when a second transmitting coil is in a second position.

As shown in FIGS. 1 and 3, the first transmitting coil 1 and the second transmitting coil 2 are in layering distribution. The term "layering distribution" (or, alternatively, "layered distribution") means that the plane where the first transmitting coil 1 is located and the plane where the second transmitting coil 2 is located are in a layering distribution, where the angle between the plane where the first transmitting coil 1 is located and the plane where the second transmitting coil 2 is located is less than 90 degrees. Further, the angle is ranged from 0° to 15°, such as 0°, 3°, 5°, 7°, 10°, and the like.

As shown in FIGS. 1-4, the second transmitting coil 2 is movable between a first position and a second position along a direction perpendicular to a central axis of the second transmitting coil. When the second transmitting coil 2 is located at the first position, an orthographic projection of the second transmitting coil 2 on a preset plane coincides with an orthographic projection of the first transmitting coil 1 on the preset plane, where the preset plane is perpendicular to the central axis. When the second transmitting coil 2 is located at the second position, the orthographic projection of the second transmitting coil 2 on the preset plane does not coincide with the orthographic projection of the first transmitting coil 1 on the preset plane. Taking two transmitting coils having the same size as an example, when the orthographic projections of the two transmitting coils coincide partially, the size of the coincident region in a direction parallel to the moving direction of the second transmitting coil 2 may be smaller than 0.25 of the size of the second transmitting coil 2 in the moving direction thereof. When the orthographic projections of the two transmitting coils do not coincide, the size between the orthographic projections of the two transmitting coils may be larger than the size of the second transmitting coil 2 in the moving direction thereof.

As shown in FIGS. 1-4, the wireless charging device of the implementation of the present disclosure may further include a housing 3 having a cavity. The first transmitting coil 1 can be fixed in the cavity. The cavity may have an opening through which the second transmitting coil 2 passes. When the second transmitting coil 2 is located at the first position, the second transmitting coil 2 is located in the cavity. When the second transmitting coil 2 is located at the second position, the second transmitting coil 2 is located outside the cavity. When the charging device does not operate or only needs to charge one terminal, the position of the second transmitting coil 2 is adjusted to make the second transmitting coil 2 to be accommodated in the cavity, thereby making the storage of the charging device more convenient.

As shown in FIGS. 1-4, the bottom surface of the above housing 3 may be perpendicular to the central axis of the second transmitting coil 2. The present disclosure can use the bottom surface of the housing 3 as the aforementioned preset plane. Further, the inner wall of the housing 3 is coupled to the rail 4. The rail 4 extends in a direction perpendicular to the central axis of the second transmitting coil 2. The second transmitting coil 2 is movably disposed on the rail 4, wherein the rail 4 may be provided with a sliding slot, and the second transmitting coil 2 may be provided with a slider that can be slidably engaged with the sliding slot. In addition, a locker can be provided in the second position. When the second transmitting coil 2 is moved to the second position, the locking hook can stop the second transmitting coil 2 in the second position. The second transmitting coil 2 can be manually moved, and of course, it is also possible to drive the movement of the second transmitting coil 2 by a driving mechanism which can be a motor, a cylinder, a hydraulic cylinder, or the like.

Figure 5:
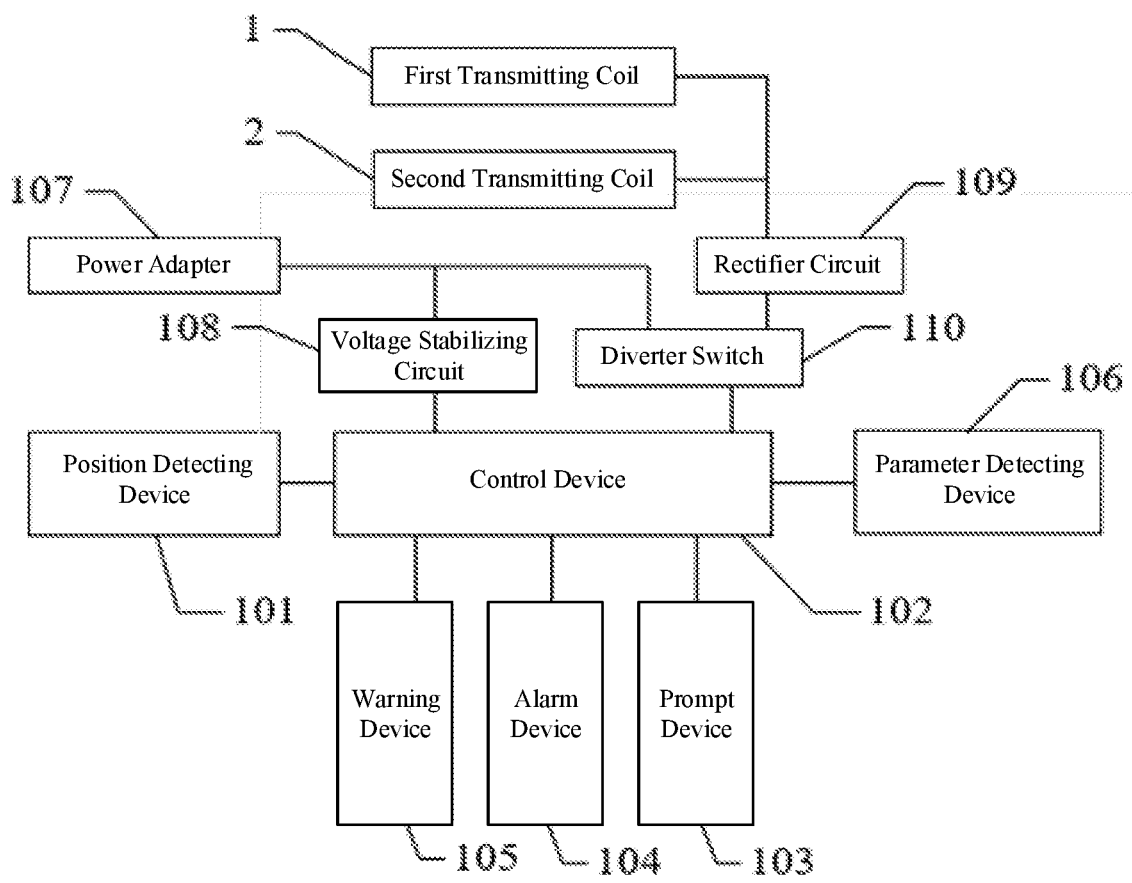
FIG. 5 is an operating block diagram of a wireless charging device of an implementation of the present disclosure.
Figure 6:
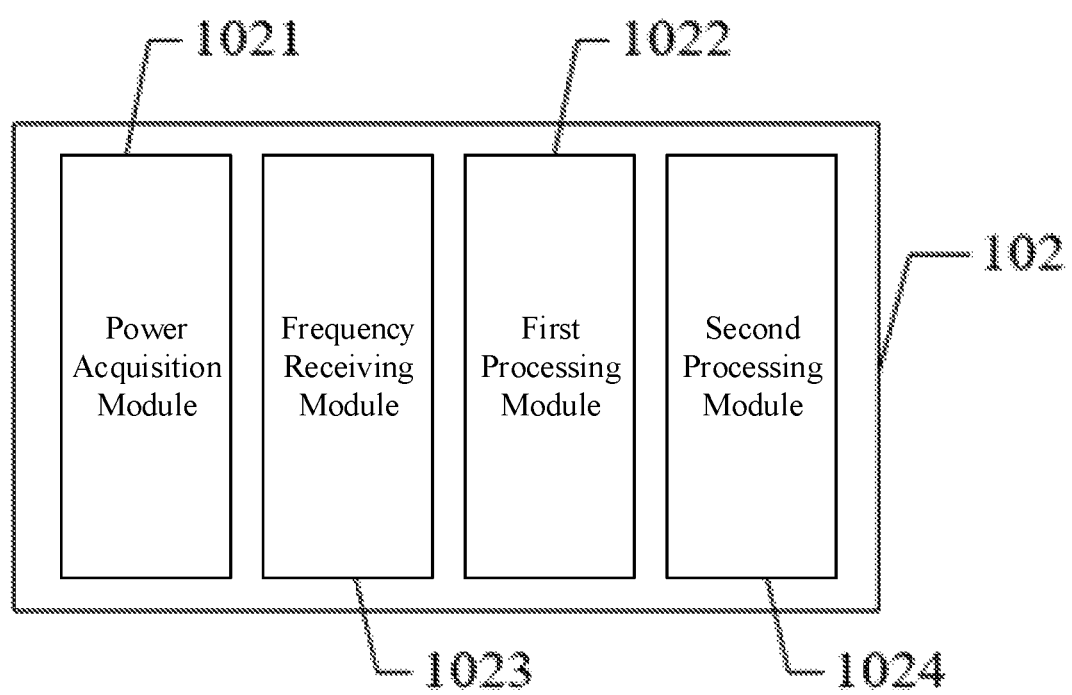
FIG. 6 is a schematic diagram of a control device of a wireless charging device of an implementation of the present disclosure.

As shown in FIGS. 5-6, the wireless charging device of the implementation of the present disclosure may further include a position detecting device 101 and a control device 102, wherein:

as shown in FIG. 5, the position detecting device 101 can be configured to detect a position of the second transmitting coil 2, and transmit a first signal when the second transmitting coil 2 is located at the first position and a second signal when the second transmitting coil 2 is located at the second position, where the position detecting device 101 may include a first position sensor and a second position sensor. The first position sensor is configured to transmit a first signal and the second position sensor is configured to transmit a second signal. The types of the first position sensor and the second position sensor may be the same or, of course, may be different. In one implementation, the first position sensor and the second position sensor are both piezoelectric switches, and the first position sensor is disposed at the first position, and the second position sensor is disposed at the second position. When the second transmitting coil 2 is in the first position, the first position sensor is triggered and generates the first signal. When the second transmitting coil 2 is in the second position, the second position sensor is triggered and generates the second signal. In other implementations of the present disclosure, the first position sensor and the second position sensor may also be other types of sensors, which will not be described in detail herein.

As shown in FIGS. 5-6, the control device 102 can be configured to control one of the two transmitting coils to be powered on in response to the first signal. The control device 102 can include a power acquisition module 1021 and a first processing module 1022. The power acquisition module 1021 is configured to control the first transmitting coil 1 to be powered on and the second transmitting coil 2 to be powered off and acquire a first charging power of the terminal in response to the first signal, and control the first transmitting coil 1 to be powered off and the second transmitting coil 2 to be powered on and acquire a second charging power of the terminal. The first processing module 1022 is configured to compare the first charging power with the second charging power; and control the first transmitting coil 1 to remain powered off and the second transmitting coil 2 to remain powered on when the first charging power is less than the second charging power, and control the first transmitting coil 1 to remain powered on and the second transmitting coil 2 to remain powered off when the first charging power is greater than the second charging power. For example, the control device 102 can be a single chip microcomputer that is electrically coupled to the position detecting device 101 described above. In addition, the control device 102 can be coupled to the driving mechanism and the control device 102 can be communicatively coupled to the driving mechanism to drive the second transmitting coil 2 to move.

According to an exemplary embodiment of the present disclosure, the respective component (e.g., the modules, units, etc.) may be constituted by a corresponding circuit. For example, the power acquisition module 1021 may include a power metering circuit, a signal conversion circuit, and the like, that are respectively configured. Alternatively, the various components may also be implemented by a processor, logic circuitry, etc. For example, the power acquisition module 1021 may include a processor that collects and/or receives power signals. Other components of the present disclosure may also be implemented in a similar manner, for example, the processing modules may include a computing circuit or a processor that is correspondingly configured, and they will not be described again herein.

As shown in FIGS. 5-6, the wireless charging device of the present disclosure can also control one of the two transmitting coils or both the two transmitting coils to be powered on by other means, where, when charging the single or multiple terminals using the charging device, the power acquisition module 1021 of the control device 102 can control the first transmitting coil 1 to be powered on in response to the charging request of the terminal, and acquire a third charging power generated by the receiving coil of the terminal under the action of the first transmitting coil 1. The first processing module 1022 can be configured to determine a magnitude of the third charging power. When the third charging power is in a first preset power range, the first processing module 1022 can control one of the two transmitting coils to be powered on. When the third charging power is in a second preset power range, both the two transmitting coils can be controlled to be powered on, where the maximum value of the first preset power range is smaller than the minimum value of the second power preset range. In addition, when the third charging power is in a third power preset range, the first processing module 1022 can control the first transmitting coil 1 to be powered off. When there is metal in the preset range of the wireless charging device, the charging power of the terminal is lowered. The maximum value of the third power preset range of the present disclosure is small, so that the wireless charging device can avoid charging the terminal in case where there is metal in the preset range of the wireless charging device. A register may be provided in the control device 102. The first preset power range, the second preset power range, and the third preset power range are set in the register.

As shown in FIGS. 5-6, after the power acquisition module 1021 of the control device 102 controls the first transmitting coil 1 to be powered on in response to the charging request of the terminal, the voltage or Q value of the receiving coil of the terminal change, thereby waking up a resonance detecting circuit of the terminal to detect the current frequency of the receiving coil. When the battery of the terminal is in a full state, the current frequency of the receiving coil will be within a certain frequency range. The present disclosure uses this frequency range as a preset frequency range. The terminal may further have a frequency transmitting module, configured to transmit the detected current frequency of the receiving coil. The control device 102 may also include a frequency receiving module 1023. The frequency receiving module 1023 can be a signal connected to the frequency transmitting module of the terminal, configured to receive the current frequency of the receiving coil of the terminal. The signal can be a digital Ping or the like. The first processing module 1022 described above may be further configured to determine a magnitude of the frequency of the receiving coil and control the first transmitting coil 1 to be powered off and issue a prompt command when the frequency is within the preset frequency range. The wireless charging device of the implementation of the present disclosure may further include a prompt device 103. The prompt device 103 can issue a prompt to the user in response to the prompt command, so that the user knows that the battery of the terminal is in a state in which the battery is full.

As shown in FIG. 5, the charging device of the implementation of the present disclosure may further include an alarm device 104. The control device 102 described above can also be configured to issue an alarm command in response to the first signal. The alarm device 104 is capable of issuing an alarm in response to the alarm command. The alarm device 104 can be a buzzer or an alarm light. The alarm light can be an LED light or the like. The charging device of the implementation of the present disclosure may further include a warning device 105. The control device 102 is further configured to issue a warning command in response to the second signal. The warning device 105 can issue the warning in response to the warning command. The warning device 105 can be a buzzer or an alarm light.

As shown in FIGS. 5-6, the charging device of the implementation of the present disclosure may further include a parameter detecting device 106, configured to detect an operating parameter of the first transmitting coil 1 or the second transmitting coil 2. The control device 102 further includes a second processing module 1024. The second processing module 1024 is configured to compare the operating parameter with a preset value and control the first transmitting coil 1 to be powered off when the operating parameter of the first transmitting coil 1 is less than the preset value, and control the second transmitting coil 2 to be powered off when the operating parameter of the second transmitting coil 2 is less than a preset value. The operating parameter may be the voltage or current of the transmitting coil, but is not limited thereto, and may be power or the like. By setting the above preset values, the charging process can be protected from the problem of device damage due to excessive voltage or current.

The wireless charging device of the implementation of the present disclosure may further include a third transmitting coil, where three transmitting coils are layered or offset, and the third transmitting coil is movable in a direction perpendicular to the central axis thereof. By moving the second transmitting coil and the third transmitting coil, the orthographic projections of any two transmitting coils on the preset plane are not coincident, and the orthographic projections of any two transmitting coils on the preset plane are partially coincident. The present disclosure may further include a fourth transmitting coil, but not limited thereto, and may also include a fifth transmitting coil, a sixth transmitting coil, and the like, so that the wireless charging device can charge more terminals.

As shown in FIG. 5, the wireless charging device of the implementation of the present disclosure may further include a power adapter 107. The input end of the power adapter 107 can be coupled to a power source, and the output end of the power adapter 107 can be coupled to the control device 102 described above to convert the alternating current output by the power source into direct current, where a voltage stabilizing circuit 108 is disposed between the output end of the power adapter 107 and the control device 102 to enable the control device 102 to operate at a stable voltage. In addition, the output end of the power adapter 107 is coupled to the two transmitting coils through the rectifier circuit 109 to convert the direct current into alternating current, and the diverter switch 110 is disposed between the output end of the power adapter 107 and the rectifier circuit 109. The control device 102 can be coupled to the diverter switch 110, the control device 102 being configured to control the two transmitting coils to be powered on or powered off.

The implementation of the present disclosure also provides a wireless charging system. The wireless charging system can include the wireless charging device of any of the above implementations. At the same time, a power source can also be included for providing power to the wireless charging device. Of course, other components, such as terminals, may also be included and will not be described in detail herein. The wireless charging device used in the wireless charging system of the implementation of the present disclosure is the same as the wireless charging device in the implementation of the wireless charging device described above and therefore, has the same beneficial effects, and the details of which are not described herein again.

The wireless charging device and the wireless charging system of the present disclosure move the second transmitting coil to the first position when charging one terminal, so that the orthographic projection of the first transmitting coil partially coincides with the orthographic projection of the second transmitting coil, expanding the electromagnetic induction area of the receiving coil of the terminal and increasing the charging efficiency, thereby improving the utilization of the transmitting coil. By moving the second transmitting coil to the second position, the orthographic projection of the first transmitting coil does not coincide with the orthographic projection of the second transmitting coil, thereby charging two terminals at the same time to improve the utilization of the transmitting coil.

Other embodiments of the present disclosure will be readily apparent upon consideration of the specification and practice by those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A wireless charging device configured to charge a terminal, comprising:
   a first transmitting coil;
   a second transmitting coil, the first transmitting coil and the second transmitting coil being in a layered distribution, the second transmitting coil being movable between a first position and a second position along a direction perpendicular to a central axis of the second transmitting coil, wherein, when the second transmitting coil is located at the first position, an orthographic projection of the second transmitting coil on a preset plane does not coincide with an orthographic projection of the first transmitting coil on the preset plane, the preset plane being perpendicular to the central axis, and, wherein, when the second transmitting coil is located at the second position, the orthographic projection of the second transmitting coil on the preset plane partially coincides with the orthographic projection of the first transmitting coil on the preset plane;
   a position detecting device configured to detect a position of the second transmitting coil, transmit a first signal when the second transmitting coil is located at the first position, and transmit a second signal when the second transmitting coil is located at the second position;
   a control device configured to control both transmitting coils to be powered on in response to the first signal, and control only one of the two transmitting coils to be powered on in response to the second signal, wherein the control device comprises a power acquisition module and a first processing module,
   the power acquisition module being configured to acquire a first charging power generated by the receiving coil of the terminal only under the action of the first transmitting coil, and
   the first processing module being configured to control the first transmitting coil to stay powered on when the first charging power is in a first preset power range, control both transmitting coils to be powered on when the first charging power is in a second preset power range, and control the first transmitting coil to be powered off when the first charging power is in a third preset power range, wherein a maximum value of the first preset power range is smaller than a minimum value of the second power preset range; and
   a housing having a rail coupled to an inner wall of the housing and perpendicular to the central axis, the second transmitting coil being movably disposed on the rail, wherein the rail is provided with a sliding slot, the second transmitting coil is provided with a slider that is slidably engaged with the sliding slot, a locking hook is provided in the second position, and the locking hook is configured to stop the second transmitting coil in the second position when the second transmitting coil is moved to the second position.

2. The wireless charging device of claim 1, wherein the housing further comprises:
   a cavity having an opening through which the second transmitting coil passes, such that, when the second transmitting coil is located at the first position, the second transmitting coil is located outside the cavity, and when the second transmitting coil is located at the second position, the second transmitting coil is located in the cavity.

3. The wireless charging device of claim 1, wherein:
   the power acquisition module is further configured to control, in response to the second signal, the first transmitting coil to be powered on and the second transmitting coil to be powered off, acquire a second charging power of the terminal, and control the first transmitting coil to be powered off and the second transmitting coil to be powered on and acquire a third charging power of the terminal; and
   the first processing module is further configured to compare the second charging power with the third charging power, control the first transmitting coil to remain powered off and the second transmitting coil to remain powered on when the second charging power is less than the charging power, and control the first transmitting coil to remain powered on and the second transmitting coil to remain powered off when the first second charging power is greater than the third charging power.

4. The wireless charging device of claim 1, wherein:
   the control device is further configured to issue an alarm command in response to the first signal; and
   the wireless charging device further comprises an alarm device configured to alarm in response to the alarm command.

5. The wireless charging device of claim 4, wherein the alarm device is a buzzer or an alarm light.

6. The wireless charging device of claim 1, wherein the position detecting device is a piezoelectric switch.

7. The wireless charging device of claim 1, wherein the wireless charging device further comprises:
   a parameter detecting device configured to detect an operating parameter of the first transmitting coil or the second transmitting coil; and
   the control device further comprises:
      a second processing module configured to compare the operating parameter with a preset value, control the first transmitting coil to be powered off when the operating parameter of the first transmitting coil is less than the preset value, and control the second transmitting coil to be powered off when the operating parameter of the second transmitting coil is less than a preset value.

8. A wireless charging system comprising:
   a terminal; and
   a wireless charging device configured to charge the terminal, the wireless charging device comprising:
      a first transmitting coil;
      a second transmitting coil, the first transmitting coil and the second transmitting coil being in a layered distribution, and the second transmitting coil being movable between a first position and a second position along a direction perpendicular to a central axis of the second transmitting coil, wherein, when the second transmitting coil is located at the first position, an orthographic projection of the second transmitting coil on a preset plane does not coincide with the orthographic projection of the first transmitting coil on the preset plane, the preset plane being perpendicular to the central axis; and, wherein, when the second transmitting coil is located at the second position, the orthographic projection of the second transmitting coil on the preset plane partially coincides with the orthographic projection of the first transmitting coil on the preset plane;
      a position detecting device configured to detect a position of the second transmitting coil, transmit a first signal when the second transmitting coil is located at the first position, and transmit a second signal when the second transmitting coil is located at the second position;

a control device configured to control both transmitting coils to be powered on in response to the first signal, and control only one of the two transmitting coils to be powered on in response to the second signal, wherein the control device comprises a power acquisition module and a first processing module, the power acquisition module being configured to acquire a first charging power generated by the receiving coil of the terminal only under the action of the first transmitting coil, and the first processing module being configured to control the first transmitting coil to stay being powered on when the first charging power is in a first preset power range, control both transmitting coils to be powered on when the first charging power is in a second preset power range, and control the first transmitting coil to be powered off when the first charging power is in a third preset power range, wherein a maximum value of the first preset power range is smaller than a minimum value of the second power preset range; and a housing having a rail coupled to an inner wall of the housing and perpendicular to the central axis, the second transmitting coil being movably disposed on the rail, wherein the rail is provided with a sliding slot, the second transmitting coil is provided with a slider that is slidably engaged with the sliding slot, a locking hook is provided in the second position, and the locking hook is configured to stop the second transmitting coil in the second position when the second transmitting coil is moved to the second position.

9. The wireless charging system of claim 8, wherein the housing further comprises:

a cavity having an opening through which the second transmitting coil passes such that, when the second transmitting coil is located at the first position, the second transmitting coil is located outside the cavity, and when the second transmitting coil is located at the second position, the second transmitting coil is located in the cavity.

10. The wireless charging system of claim 8, wherein:

the power acquisition module is further configured to control, in response to the second signal, the first transmitting coil to be powered on and the second transmitting coil to be powered off, acquire a second charging power of the terminal, control the first transmitting coil to be powered off and the second transmitting coil to be powered on, and acquire a third charging power of the terminal; and the first processing module is further configured to compare the second charging power with the third charging power, control the first transmitting coil to remain powered off and the second transmitting coil to remain powered on when the second charging power is less than the third charging power, and control the first transmitting coil to remain powered on and the second transmitting coil to remain powered off when the second charging power is greater than the third charging power.

11. The wireless charging system of claim 8, wherein:

the control device is further configured to issue an alarm command in response to the first signal; and the wireless charging device further comprises: an alarm device configured to alarm in response to the alarm command.

12. The wireless charging system of claim 11, wherein the alarm device is a buzzer or an alarm light.

13. The wireless charging system of claim 8, wherein the position detecting device is a piezoelectric switch.

14. The wireless charging system of claim 8, wherein the wireless charging device further comprises:

a parameter detecting device configured to detect an operating parameter of the first transmitting coil or the second transmitting coil; and the control device further comprises: a second processing module configured to compare the operating parameter with a preset value, control the first transmitting coil to be powered off when the operating parameter of the first transmitting coil is less than the preset value, and control the second transmitting coil to be powered off when the operating parameter of the second transmitting coil is less than a preset value.

15. A method, comprising:

providing a wireless charging device and charging a terminal using the wireless charging device, the wireless charging device comprising:

a first transmitting coil;

a second transmitting coil, the first transmitting coil and the second transmitting coil being in a layered distribution, the second transmitting coil being movable between a first position and a second position along a direction perpendicular to a central axis of the second transmitting coil, wherein, when the second transmitting coil is located at the first position, an orthographic projection of the second transmitting coil on a preset plane does not coincide with an orthographic projection of the first transmitting coil on the preset plane, the preset plane being perpendicular to the central axis, and, wherein, when the second transmitting coil is located at the second position, the orthographic projection of the second transmitting coil on the preset plane partially coincides with the orthographic projection of the first transmitting coil on the preset plane; and a housing having a rail coupled to an inner wall of the housing and perpendicular to the central axis, the second transmitting coil being movably disposed on the rail, wherein the rail is provided with a sliding slot, the second transmitting coil is provided with a slider that is slidably engaged with the sliding slot, a locking hook is provided in the second position, and the locking hook is configured to stop the second transmitting coil in the second position when the second transmitting coil is moved to the second position;

detecting, by a position detecting circuit, a position of the second transmitting coil, transmitting a first signal when the second transmitting coil is located at the first position, and transmitting a second signal when the second transmitting coil is located at the second position;

controlling, by a control circuit, both transmitting coils to be powered on in response to the first signal, and controlling only one of the two transmitting coils to be powered on in response to the second signal, wherein the control circuit comprises a power acquisition circuit and a first processing circuit;

acquiring, by the power acquisition circuit, a first charging power generated by the receiving coil of the terminal only under the action of the first transmitting coil;

controlling, by the first processing module, the first transmitting coil to stay powered on when the first charging power is in a first preset power range, controlling both transmitting coils to be powered on when the first charging power is in a second preset power range, and controlling the first transmitting coil to be powered off when the first charging power is in a third preset power range, wherein a maximum value of the first preset power range is smaller than a minimum value of the second power preset range.

\* \* \* \* \*